UNITED STATES PATENT OFFICE.

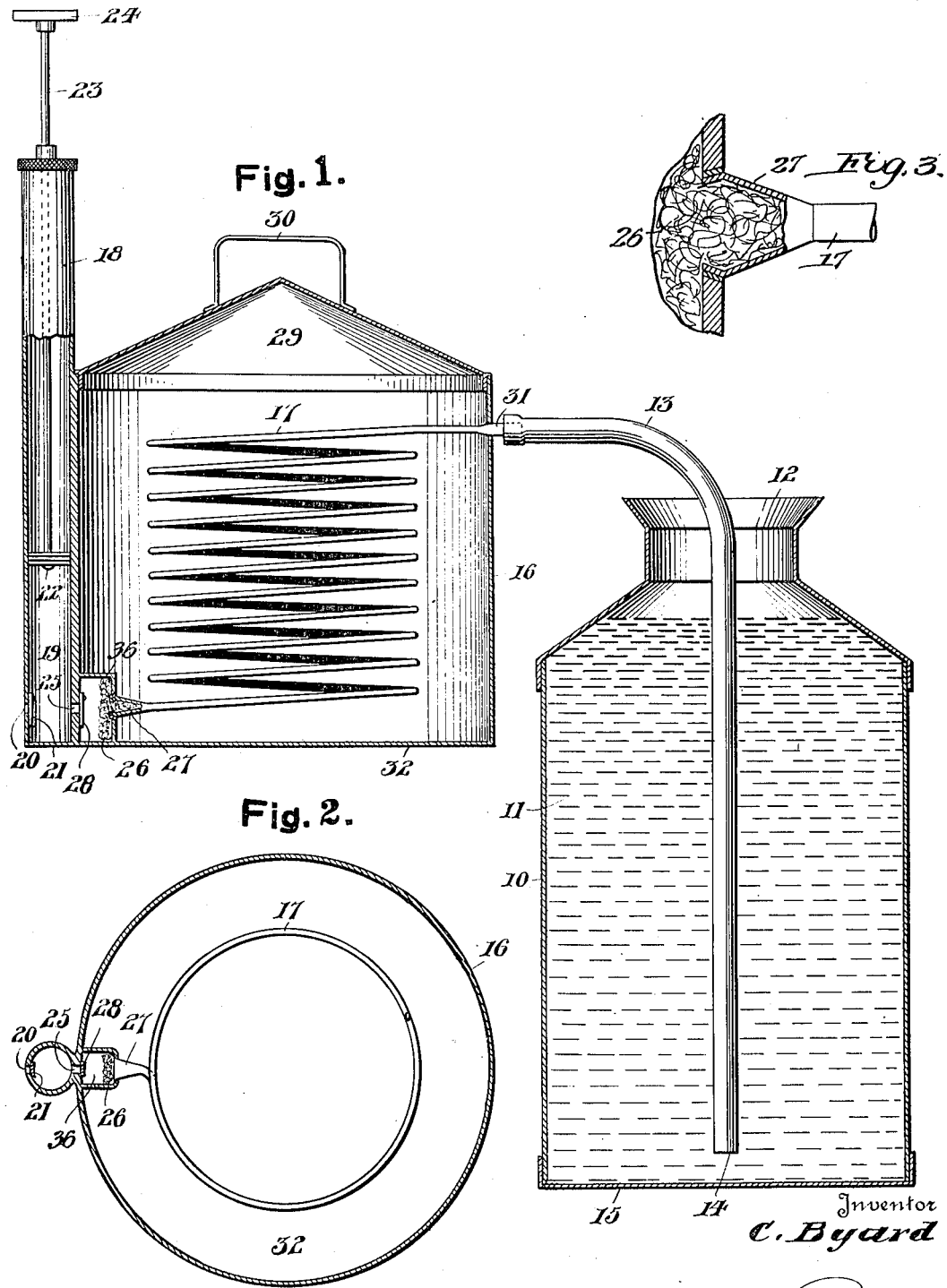

CHARLES BYARD, OF ONEONTA, NEW YORK.

MILK COOLER AND AERATOR.

1,207,133.  Specification of Letters Patent.  Patented Dec. 5, 1916.

Application filed June 13, 1916. Serial No. 103,376.

*To all whom it may concern:*

Be it known that I, CHARLES BYARD, a citizen of the United States of America, residing at Oneonta, in the county of Otsego and State of New York, have invented certain new and useful Improvements in Milk Coolers and Aerators, of which the following is a specification.

This invention relates to new and useful improvements in milk cooler and aerator.

The object of the present invention is the provision of an aerator for milk that is easy and inexpensive to manufacture and which combines an air compressor with an air cooling coil, the cooled compressed air being readily fed into and discharged adjacent the lower level of the milk for rising therethrough to the surface during the aerating operation, while a sanitary strainer means is arranged for the air as it enters the coil having a straining medium which is readily removable upon disconnecting the inlet end of the coil when found desirable.

In the drawings forming a part of this application and in which like designating characters refer to corresponding parts throughout the several views:—Figure 1 is a vertical central sectional view taken through the device and through a milk can arranged in operative relations thereto, the air compressor being partially shown in side elevation, Fig. 2 is a horizontal transverse sectional view through the device, and Fig. 3 is an enlarged detail view partly in section illustrating the detachable connection between the coil and pocket of the device.

It being understood that the present arrangement is designed for the aeration of milk, the same is herein illustrated in connection with a milk can 10 filled with milk 11 and having an open mouth 12 through which the flexible air exhausting hose or outlet 13 of the device is inserted, the said hose terminating in an open end 14 adjacent the bottom 15 of the milk can 10.

The aerator broadly consists of a bucket or container casing 16 preferably formed of metal and having a cooling coil 17 arranged therein to which the hose 13 is attached, while an air pump or compressor 18 is arranged exteriorly of the casing 16 in communication with the cooling coil 17.

The compressor 18 is substantially in the form of a bicycle pump of tubular arrangement having an air chamber 19 therein to which air is admitted through an inlet port 20 communicating with the atmosphere and provided with a check valve 21 preventing air from escaping therethrough, any desirable form of check valve accomplishing such purpose, a flat valve being herein shown. A piston 22 is slidably arranged within the chamber 19 being operable by a rod 23 terminating at its upper end in an operating handle 24 and as will be evident the reciprocations of the piston 22 and rod 23 results in drawing air inwardly of the chamber 19 through the inlet port 20 and forcing the same out of said chamber through the outlet port 25 into a pocket 36 with which the flared inlet end 27 of the coil 17 communicates, the said end 27 being detachably connected to the said pocket. A depending swinging check valve 28 controls the passage of air through the outlet port 25 permitting the air to escape therethrough into the pocket 36 but preventing any return of the air through such port into the chamber 19. An air straining medium 26 is preferably arranged within the pocket 36 extending inwardly of the coil inlet 27, the said pocket serving the dual purpose of a strainer holder and a trap for any impurities entering through the port 25, it being noted that the said port 25 and coil inlet end 27 are arranged in substantially horizontal alinement with each other and with the inlet port 20 and above the level of the receptacle bottom 32. The said straining medium 26 being positioned within the pocket 36, arranged at one side thereof within the swinging path of movement of the said valve 28, the same also acts as a cushioning stop for the valve 28.

A cover or lid 29 is arranged for the casing 16 provided with a handle 30 for readily removing the same. The hose 13 is removably connected to the coil 17 at the upper enlarged end 31 thereof extending outwardly through the side of the casing 16 and being at the opposite end of the coil 17 from the aforementioned inlet end 27 which is arranged adjacent the bottom 32 of the said casing 16.

From this detailed description of the invention, the complete operation thereof will be at once apparent. The casing 16 is adapted to be filled with ice (not shown) or any other form of cooling medium, the same preferably being arranged to completely envelop the coil 17, the lid 29 being normally closed for effecting better refrigeration. The entire device is seated upon the casing bottom 32 at any convenient point so that the milk cans such as 10 may be arranged conveniently for placing the flexible outlet hose 13 of the device into the milk 11 contained therein. The pump 18 is then operated for drawing in fresh air through the port 20 and forcing the same through the port 25 and the pocket 36 to the coil inlet end 27 and thence through the entire coil 17 which is in an extremely cold state, thus furnishing the hose 13 with pure air under pressure at a low temperature. The flared end 27 of the coil 17 being detachable from the pocket 36 allows the straining medium 26 to be pulled out of the said pocket when the coil is detached therefrom, thereby making provision for supplying a clean strainer as well as removing any particles collected in the pocket 36 during the operation of the device. Such air entering the milk adjacent the can bottom 15 passes upwardly through the milk 11 to the surface thereof for aerating and cooling the entire milk body. It will thus be seen that a serviceable although inexpensive device is now provided whereby milk in any desirable quantities may be readily and inexpensively purified by aeration, the air employed being strained prior to entering the cooling means therefor.

What I claim as new is:—

A milk aerator comprising in combination with a refrigerating coil having an outlet member adapted for submersion in milk, a pump adapted for supplying air to said coil, a trap pocket between said coil and pump having a communicating port between said pocket and pump, the said coil having a flared inlet end detachably secured to said pocket opposite the said port and communicating with the interior of the pocket, a swinging valve for said port arranged within said pocket, and straining material within said pocket adjacent one side thereof within the limiting path of movement of said valve and projecting within the flared end of the coil.

In testimony whereof I affix my signature.

CHARLES BYARD.